US005692312A

United States Patent [19]

Coeyman, Jr.

[11] Patent Number: 5,692,312

[45] Date of Patent: Dec. 2, 1997

[54] AUTO ANGLER

[76] Inventor: Robert Lee Coeyman, Jr., 929 Long Cove Rd., Glen Burnie, Md. 21060-8461

[21] Appl. No.: 613,330

[22] Filed: Mar. 11, 1996

[51] Int. Cl.[6] G01B 3/10

[52] U.S. Cl. 33/700; 33/16; 33/701; 33/764

[58] Field of Search 33/700, 764, 16, 33/1 K, 1 N, 121, 701, 712, 759, 760, 516, 545, 546, 194, 613

[56] References Cited

U.S. PATENT DOCUMENTS

| | | | |
|---|---|---|---|
| 2,758,380 | 8/1956 | Harris | 33/1 N |
| 3,808,690 | 5/1974 | Balder | 33/613 |
| 3,885,314 | 5/1975 | Banas, Sr. | 33/764 |
| 4,381,607 | 5/1983 | Place | 33/1 G |
| 4,423,555 | 1/1984 | Wootten | 33/194 |
| 4,565,005 | 1/1986 | Naka | 33/764 |
| 4,642,898 | 2/1987 | Miller | 33/764 |
| 5,167,073 | 12/1992 | Stein | 33/194 |
| 5,390,425 | 2/1995 | Gilberts | 33/764 |

*Primary Examiner*—William A. Cuchlinski, Jr.
*Assistant Examiner*—Andrew Hirshfeld
*Attorney, Agent, or Firm*—Patent & Trademark Services; Joseph H. McGlynn

[57] ABSTRACT

A measuring system for making accurate measurements when cutting building material to fit odd or uneven shapes. The measuring system comprises two types of measuring blocks. The first block is used to measure distances between two uncovered wall studs or joists, and the second block is used to measure distances between an uncovered wall stud or joist and a surface which is covered with a material such as wallboard. By nailing the blocks around the perimeter of the opening, that the building material will cover, and using a plurality of tape measures to obtain at least two measurements from two fixed points to selected points around the perimeter of the opening, accurate dimensions may be obtained regardless of how out of plumb or uneven the opening may be. The system also includes a jig for transferring these dimensions onto the material to be cut, and a tool that can be attached to the end of a tape measure to obtain an accurate mark on the material to be cut.

7 Claims, 2 Drawing Sheets

FIG. 1
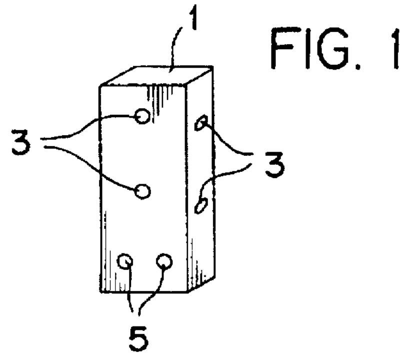
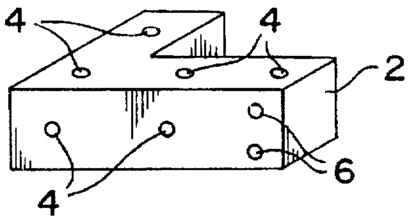
FIG. 2
FIG. 3
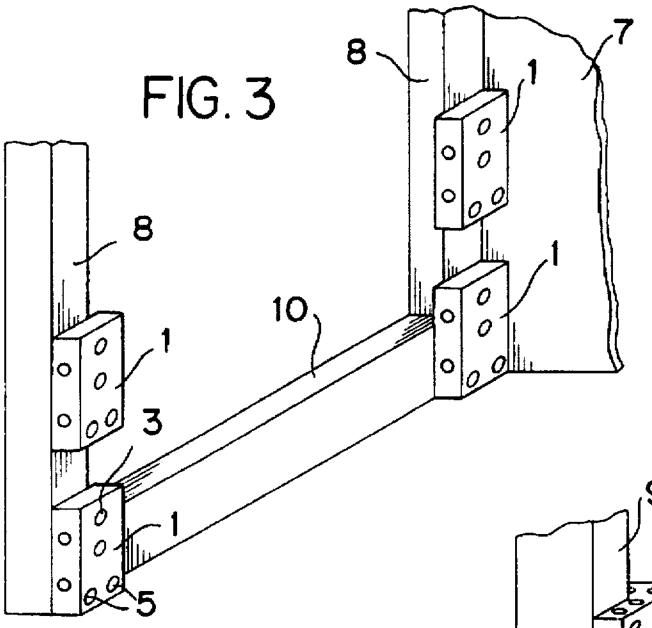
FIG. 4
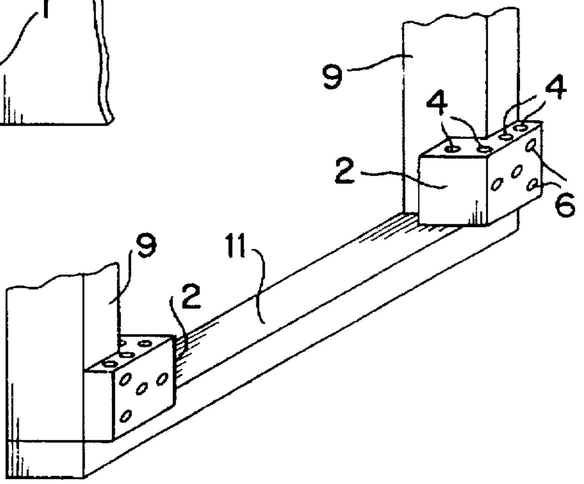
FIG. 5
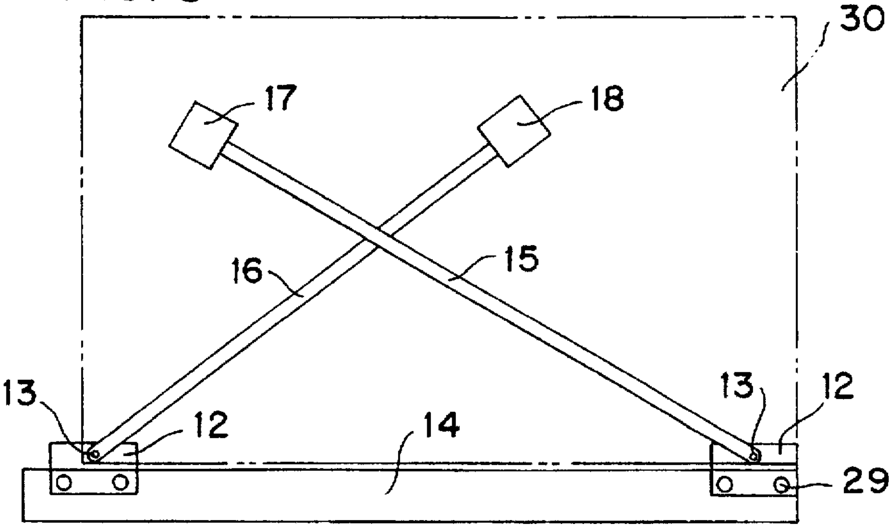

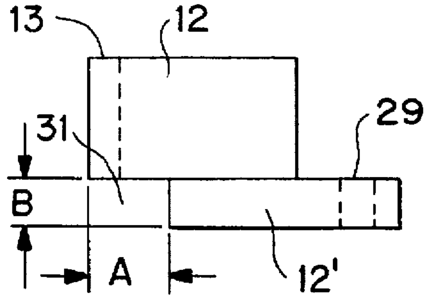
FIG. 6
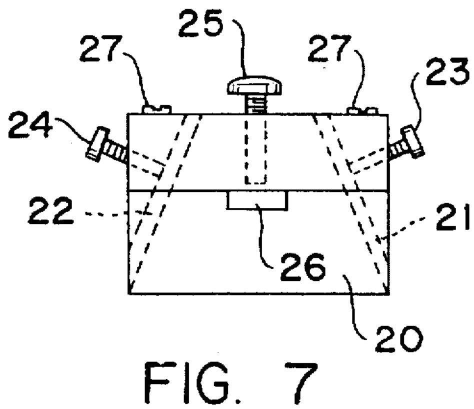
FIG. 7
FIG. 8
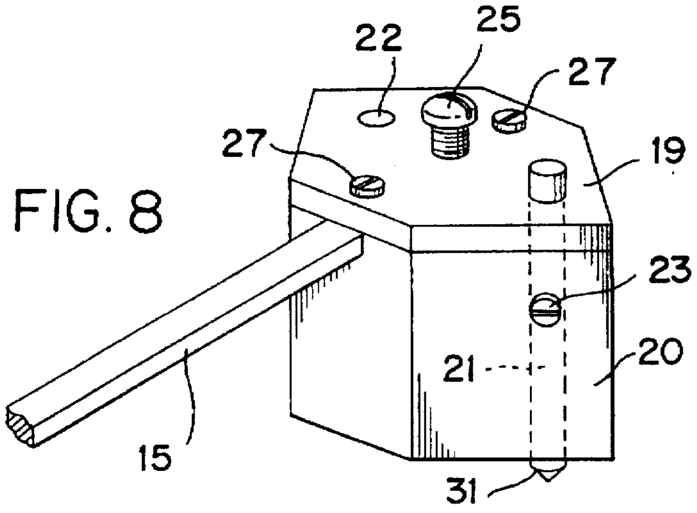
FIG. 9
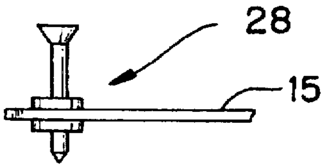
FIG. 10
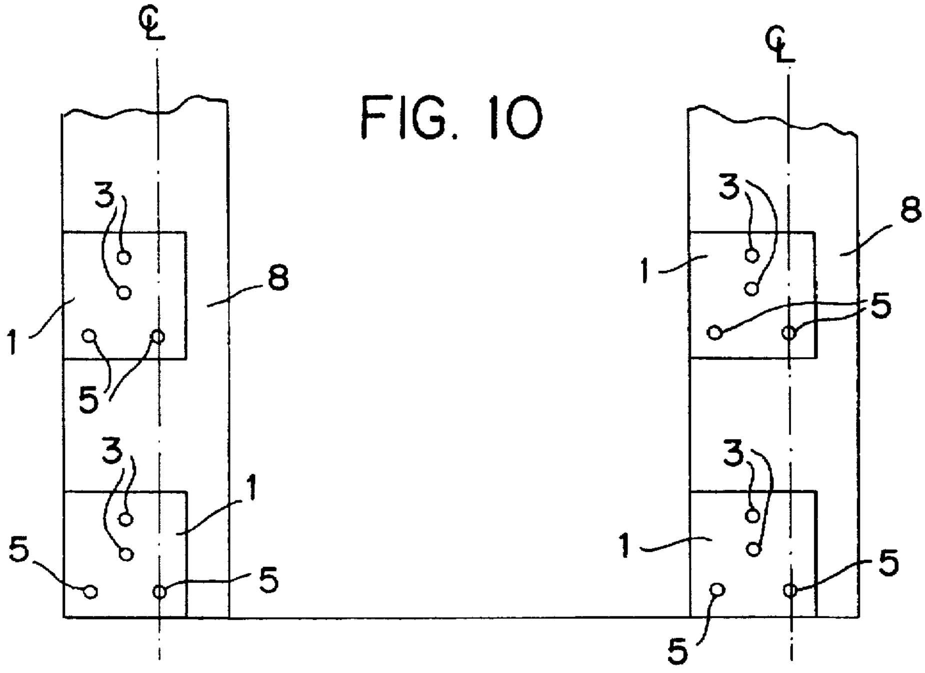

AUTO ANGLER

BACKGROUND OF THE INVENTION

This invention relates, in general, to a measuring system, and, in particular, to a measuring system for accurately measuring uneven shapes.

1. Description of the Prior Art

In the prior art various types of measuring devices have been proposed in the prior art. For example, U.S. Pat. No. 3,885,314 discloses a two-way measuring device which has a pair of tape measures which can be extended in opposite directions. U.S. Pat. No. 4,565,005 discloses a right angle index device which has two tape measures and a mechanism for withdrawing both tapes by the same length. U.S. Pat. No. 4,642,898 discloses a marking tool that can be attached to the end of a tape measure. U.S. Pat. No. 5,390,425 discloses a tool guiding apparatus for measuring a portion of a work piece and guiding a tool during an operation on the work piece.

However none of the prior art devices take into account that when cutting a piece of material to fit an opening, the opening may not be even. Therefore, in order to cut a piece of material it is not enough to measure the width and the length at two points, draw lines between the points and cut the material along the drawn lines.

In the building industry today homes are, many times, constructed which do not have walls, floors, ceilings, etc. which are plumb or straight. That is the walls and the ceiling do not meet at right angles because the homes had odd architecture or the builders were "making due" with poor quality materials. In addition, builders will sometimes build houses with odd shapes in order to create a "different look" that will be out of the ordinary and, therefore, more appealing to a potential buyer. This creates many problems for the builder or the remodeler who must work with these uneven dimensions.

For example, take the case of a wall that is out of plumb with an adjacent ceiling. In order to place wallboard on the studs that support the wall, the dimension from the floor to the ceiling might be a certain dimension while the dimension at a distance two feet away might be smaller or larger than the first dimension. Cutting the wall board to the proper shape could be very difficult. One method that was commonly used in this type of situation was to cut the material see where it would or would not fit, and then cut a second piece while compensating for the errors made while cutting the first piece. However, the costs of building materials continue to escalate, and that makes this method very expensive.

SUMMARY OF THE INVENTION

The present invention solves the problem of making accurate measurements when cutting building material to fit odd or uneven shapes. The measuring system of the present invention comprises two types of measuring blocks. The first block is used to measure distances between two uncovered wall studs or joists, and the second block is used to measure distances between an uncovered wall stud or joist and a surface which is covered with a material such as wallboard. By nailing the blocks around the perimeter of the opening that the building material will cover, and using a plurality of tape measures to obtain at least two measurements from two fixed points to selected points around the perimeter of the opening, accurate dimensions may be obtained regardless of how out of plumb or uneven the opening may be. The system also includes a jig for transferring these dimensions onto the material to be cut, and a tool that can be attached to the end of a tape measure to obtain an accurate mark on the material to be cut.

It is an object of the present invention to provide a measuring system making accurate measurements when cutting building material to fit odd or uneven shapes.

It is an object of the present invention to provide a measuring system that is easy to use.

It is an object of the present invention to provide a measuring system that is inexpensive to manufacture.

These and other objects and advantages of the present invention will be fully apparent from the following description, when taken in connection with the annexed drawings.

BRIEF DESCRIPTION OF THE DRAWINGS

FIG. 1 is a view of one of the measuring blocks of the present invention.

FIG. 2 is a view of of another of the measuring blocks of the present invention.

FIG. 3 is a view of the measuring blocks of the present invention in place on a wall.

FIG. 4 is a view of the other measuring blocks of the present invention in place on a wall.

FIG. 5 is a view of the transfer jig of the present invention.

FIG. 6 is a view of one of the blocks used with the transfer jig.

FIG. 7 is a side view of the tool that can be attached to the end of a tape measure.

FIG. 8 is a perspective view of the tool that can be attached to the end of a tape measure.

FIG. 9 is a view of the pivot pin used with the various blocks of the present invention.

FIG. 10 is a view showing the proper placement of measuring blocks when material is to be cut which will extend from the center of one stud to the center of another stud.

DESCRIPTION OF THE PREFERRED EMBODIMENT

Referring now to the drawings in greater detail, FIG. 1 shows the measuring block 1 used to make measurements between an uncovered stud or joist 8 and a finished wall 7 (as shown in FIG. 3). The block can be made in various dimensions but they should be large enough to have at least four nailing holes 3 in at least two different faces of the block and at least a pair of pivot holes 5. The pivot holes 5 must be placed on the stud at the position that the edge of the wallboard or other material will be placed. For example, FIG. 10 shows four blocks 1 being used to measure a piece of material which will fit between uncovered studs 8. The material will extend from the center line (C/L) of one stud to the center line of another stud, therefore, one of the pivot holes 5 on each block will be aligned with the center line of each stud and then the blocks will be nailed to the studs through the nail holes 3. Each block should have nailing holes 3 in at least two different faces in order to allow the blocks to be conveniently nailed to horizontal or vertical studs or joists.

FIG. 2 shows the measuring block 2 used to make measurements between uncovered studs or joists 9. This block also has at least four nailing holes 4 in at least two different faces of the block and at least a pair of pivot holes 6. The block 2 is also made L-shaped so it can be attached to two different surfaces of the studs or joists as shown in FIG. 4.

Since the method of use is the same for both blocks 1 and 2 only one of the blocks will be referred to in describing how to use the measuring blocks. In order to make an accurate measurement of a piece of building material, such as wallboard, that will be attached to studs 8 (see FIG. 3) where the studs are next to an already finished wall covered with wallboard 7, a plurality of measuring blocks 1 will first be nailed to the studs. Although only four blocks 1 are shown it is to be understood that more of the blocks can be used. Once all of the blocks have been nailed (by means of nails passing through at least two of the nail holes 3) into position, the measurements can be taken.

It is important that the blocks be easily removed after the measurements are taken and, therefore, multiple headed nails, such as the nail 28 shown in FIG. 9 can be used. Nail 28, or a similar device, is then inserted through the hole in the end of an extendible tape measure and then into one of the pivot holes 5 in one of the bottom blocks 1. The pivot hole 5 that is selected should be exactly where the edge of the wallboard will be placed on the stud. A second nail is inserted into one of the pivot holes 5 in the other bottom block 1 and a first measurement is taken between the pivot holes in the bottom blocks 1.

This first measurement will establish the distance between the lower right and left blocks of FIG. 3. Next a nail will be placed in a pivot hole in the upper right block and a measurement taken from that pivot hole to the pivot hole in the lower left block. Next a nail will be placed in a pivot hole in the upper right block and a measurement taken from that pivot hole to the pivot hole in the lower right block. These two dimensions will be recorded, and the measurement process will be repeated for all the remaining blocks 1. When finished a dimension will be recorded from a common point (the pivot hole 5 in the lower left block) to each pivot hole in all of the other blocks 1 (i.e. the pivot holes 5 in the lower right block, the upper right block and the upper left block). In addition, a second dimension will be recorded from a common point (the pivot hole 5 in the lower right block) to each pivot hole in all of the other blocks 1 (i.e. the pivot holes 5 in the lower right block, the upper right block and the upper left block).

In order to transfer these dimensions to the material to be cut, the jig shown in FIG. 5 will be used. The jig consists of a base piece 14 which should measure at least 96 inches long, although other dimensions could be used. Attached to the base piece 14 is a pair of blocks 12 and 12' (shown also in FIG. 6) which can slide along the base piece 14. These blocks consist of an upper portion 12 and a lower portion 12' which is offset form the upper portion to form a rabbit 31. The dimension B should be approximately ¼ inch and the dimension A should be approximately ½ inch. The blocks will be nailed to the base piece 14 by means of nails through apertures 29. Pivot pins will be placed through apertures 13 and the two blocks should be placed a distance apart that is equal to the distance between the lower two blocks 1 shown in FIG. 3.

Once the blocks 12 are placed the proper distance apart, two tape measures 17, 18 with extendible tapes 15, 16, respectfully, will be used to recreate the dimensions taken above.

First the material to be cut will be placed on the jig with the material inserted into the rabbit 31 on the block portions 12 and 12'. A pivot pin will be passed through the opening in the ends of the tapes 15, 16, and then into the pivot holes 13 in the blocks. The tape measure 18 will be pulled out until it shows the dimension recorded between the block 1 on the lower left in FIG. 3 and the block on the upper left. While holding this tape in the proper position, the tape measure 17 will be extended until it shows the dimension recorded between the block 1 on the lower right in FIG. 3 and the block on the upper left. When the two tapes are in the proper position this location will be marked. This mark accurately locates a point on the opening to be covered. This process will be repeated until every point has been marked using two dimensions from a fixed point for accuracy. Then the points will be connected and an accurate measurement of the opening will be marked on the material 30 shown in dotted lines in FIG. 5. All that remains is to cut the material along the lines marked.

The same procedure will be used to measure between uncovered studs or joists, as shown in FIG. 4. Since the studs or joists are uncovered the right angle blocks 2 can be used. Also, it should be noted that only two of the blocks 2 are shown in FIG. 4, but it should be understood that more of the blocks could be attached to the studs 9 in order to make accurate measurements.

In FIGS. 7 and 8 a slider block is shown that can be attached to the tape measures 17, 18 in order to make accurate marks on the material 30 to be cut. The block consists of an upper portion 19 joined to a lower portion 20 by screws 27, or any other conventional means. Lower block 20 has a channel 26 formed therein which will receive one of the extendible tapes 15, 16. A thumb screw or set screw 25 is threaded into the upper portion 19 and will intersect channel 26 and will firmly hold the tapes within the block. Two slanted holes 21, 22 pass from the upper surface of portion 19 to the lower corner of portion 21 as shown in FIG. 7. A marking device such as a pencil 31 will be placed into these holes and will be held in place by thumb screws or set screws 23, 24.

In order to use the slider block, one of the blocks will be attached to each of the ends of tapes 15, 16. A marking device will be placed into the hole 21 on the slider attached to tape 16, and a marking device will be placed into the hole 22 on the slider attached to tape 15. When the measurements are made using the jig shown in FIG. 5, the marking device on tape 16 will be used to draw an arc on the material 30 to be cut. Next the marking device on tape 15 will be used to draw an arc on the material 30 to be cut. Where the two arcs intersect is the exact measurement made using the blocks 1 in FIG. 3, or the blocks 2 in FIG. 4.

Also, even though the present invention has been described as being used to cut a piece of material, such as wallboard to proper size, it can be used where ever an accurate measurement is needed. For example, if a wall-board has to be cut to allow for openings for pipes or electrical outlets, this system can be employed to accurately measure the opening needed from a fixed plane of reference, such as a floor, wall or ceiling. Also, materials can be cut to fit spaces which are not rectangular. By employing enough blocks 1 or 2, circles or ellipses can be cut with great accuracy.

Although the measuring system and the method of using the same according to the present invention has been described in the foregoing specification with considerable details, it is to be understood that modifications may be made to the invention which do not exceed the scope of the appended claims and modified forms of the present invent ion done by others skilled in the art to which the invention pertains will be considered infringements of this invention when those modified forms fall within the claimed scope of this invention.

What I claim as my invention is:

1. A measuring system for measuring an opening and transferring measurements to a material to fit said opening comprising:

at least two opening measuring blocks having means for attaching said blocks to the perimeter of said opening, means for attaching a pivot pin to each of said opening measuring blocks, whereby a measurement can be taken between the pivot pin on one of the opening measuring blocks and the pivot pin on another of the opening measuring blocks, a jig having a base piece, two jig measuring blocks, means for attaching the two jig measuring blocks to said base piece, means for attaching a pivot pin to each of said two jig measuring blocks, a measuring means attached to each of said two jig measuring blocks, whereby measurements made between said opening measuring blocks can be transferred to the material using said two jig measuring blocks and said measuring means.

2. The measuring system as claimed in claim 1, wherein each of said opening measuring blocks has at least two of said means for attaching a pivot pin thereto.

3. The measuring system as claimed in claim 1, wherein said means for attaching said opening measuring blocks to the perimeter of said opening are placed on two sides of each of said opening measuring blocks.

4. The measuring system as claimed in claim 1, wherein said opening measuring blocks are L-shaped.

5. The measuring system as claimed in claim 1, wherein said jig measuring blocks have a rabbit thereon for receiving said material.

6. The measuring system as claimed in claim 1, wherein each of said measuring means have a slider block attached adjacent an end thereof, said slider blocks comprising an upper portion and a lower portion, means for securing said portions together, means in one of said portions for receiving said measuring means, aperture means extending through said portions for receiving a marking means.

7. A method of using a measuring system for measuring an opening and transferring measurements to a material to fit said opening, said measuring system comprising:

at least three opening measuring blocks having means for attaching said blocks to the perimeter of said opening, means for attaching a pivot pin to each of said opening measuring blocks, whereby a measurement can be taken between the pivot pin on one of the opening measuring blocks and the pivot pin on another opening measuring blocks, a jig having a base piece, two jig measuring blocks, means for attaching the two jig measuring blocks to said base piece, means for attaching a pivot pin to each of said two jig measuring blocks, a measuring means attached to each of said two jig measuring blocks, said method comprising:

A) attaching said at least three opening measuring blocks around the perimeter of said opening, B) obtaining a first measurement by measuring from the pivot pin in a first one of said opening measuring blocks on one side of said opening to the pivot pin in a second one of said opening measuring blocks on the opposite side of said opening, C) spacing said two jig measuring blocks apart a distance equal to said first measurement, D) measuring from said pivot pin in said first one of said opening measuring blocks to the pivot pin in a third one of the opening measuring blocks, E) measuring from said pivot pin in said second opening measuring block to said pivot pin in said third opening measuring block, F) using said measuring means attached to each of said two jig measuring blocks to transfer the measurements from steps D and E to said material to fit said opening.

* * * * *